Figure 1:
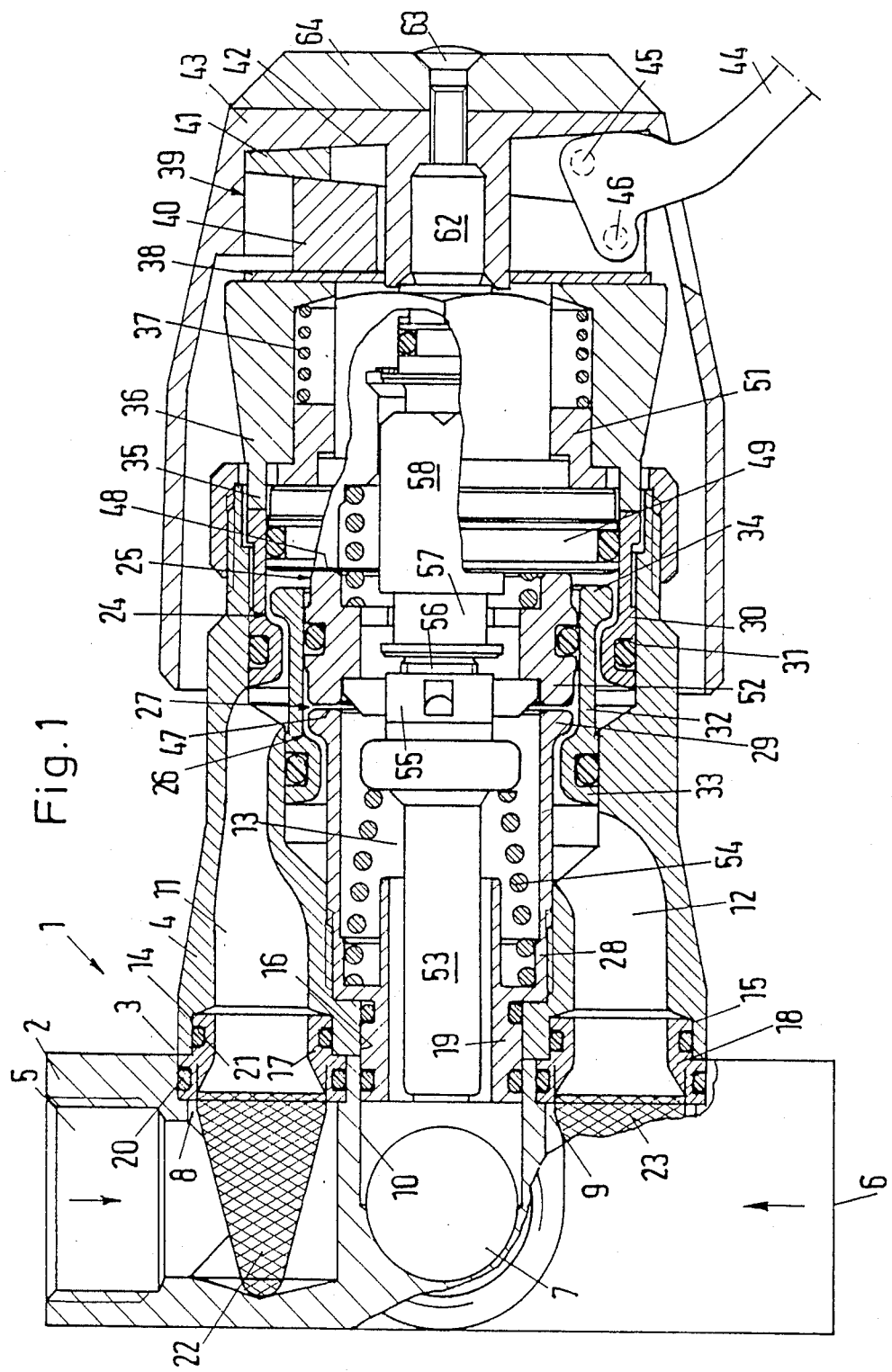

United States Patent [19]

Avelöv

[11] Patent Number: 4,863,097
[45] Date of Patent: Sep. 5, 1989

[54] THERMOSTATIC MIXING VALVE

[75] Inventor: Rolf I. Avelöv, Mjölby, Sweden

[73] Assignee: Danfoss A/S, Nordborg, Denmark

[21] Appl. No.: 290,568

[22] Filed: Dec. 27, 1988

[30] Foreign Application Priority Data

Jan. 8, 1988 [DE] Fed. Rep. of Germany ....... 3800305

[51] Int. Cl.⁴ .............................................. G05D 23/13
[52] U.S. Cl. .................................................. 236/12.2
[58] Field of Search ................. 236/12.16, 12.2, 12.21, 236/12.22

[56] References Cited

U.S. PATENT DOCUMENTS

| | | | |
|---|---|---|---|
| 3,827,016 | 7/1974 | Knapp | 236/12.2 |
| 3,955,759 | 5/1976 | Knapp | 236/12.2 |
| 4,029,256 | 6/1977 | Dauga | 236/12.2 |
| 4,760,953 | 8/1988 | Toubert | 236/12.2 |

Primary Examiner—William E. Tapolcai
Attorney, Agent, or Firm—Wayne B. Easton; Clayton R. Johnson

[57] ABSTRACT

This invention relates to a thermostatic mixing valve that includes a housing, temperature control valves in the housing that have axially spaced cold and warm water regulating bases and a valve element for cooperating with the above valve bases to reversely vary the flow of the cold water and warm water to the housing outlet port, and cold and warm water quantity setting valves upstream of the temperature regulating valves for controlling the quantity of the cold and warm water flow from the housing cold water and warm water supply ports to the cold and water regulating valves respectively. The quantity setting valves have axially spaced quantity setting valve bases and a common valve member axially movable relative to the quantity setting valve bases for controlling downstream flow from the supply ports, the pressure at the supply ports acting in the same axial direction against the common valve member. Adjustable quantity control mechanism is provided for controlling the axial position of the quantity cold water base relative to the common valve member and the quantity warm water base, and adjustable temperature control mechanism including a thermostatic operating element for actuating the valve element to control the temperature of water at the outlet port.

13 Claims, 3 Drawing Sheets

THERMOSTATIC MIXING VALVE

The invention relates to a thermostatic mixing valve comprising a housing, a thermostatic operating element provided with a temperature setting apparatus and for actuating a first valve element which, with two regulating bases, forms cold and warm water regulating valves adjustable in opposite senses, and a quantity setting apparatus for the amount of mixed water.

In a known thermostatic mixing valve of this kind (U.S. Pat. No. 3,228,603), the cold and warm water regulating valves do not only serve to regulate the temperature but also the quantity. For this purpose, the one regulating valve base is fixed with respect to the housing and the other regulating valve base is axially adjustable with the aid of a quantity setting apparatus in the form of a knob. A rotary button on the knob permits a desired value temperature setting to be given to the thermostatic operating element and thus to the valve element co-operating with the two regulating valve bases. By means of the second regulating valve base approaching the first regulating valve base, the regulating valves can also be completely closed, so that it is possible to withdraw the operating element, but not the entire valve element. Upon changing the quantity setting, the valve element retains its position in relation to the second regulating valve base whilst the spacing from the first regulating valve base changes. This leads to an undesirable temperature fluctuation. Similar temperature fluctuations arise if the pressure conditions between the warm water and cold water supply vary.

It is also known to separate the functions of the temperature regulation and quantity regulation by placing a quantity setting valve in the mixed water discharge passage. Although this gives a simple construction, it leads to the warm water supply and the cold water supply being in constant communication with each other by way of the two regulating valves and thus, if the pressure conditions are unfavourable, the warm water could flow directly into the cold water conduit.

The invention is based on the problem of providing a thermostatic mixing valve of the aforementioned kind in which the quantity and temperature can be adjusted substantially independently of each other.

This problem is solved according to the invention in that the cold water regulating valve and the warm water regulating valve are each preceded by a quantity setting valve and that the quantity setting valves comprise two setting valve bases relatively axially adjustable by the quantity setting apparatus and a common second valve element which assumes a position depending on the pressures in the cold water supply and warm water supply.

In this construction, the quantity setting valves are separated from the regulating valves. If one changes the quantity setting, the conditions at the regulating valves remain unaltered. Since the quantity setting valves are upstream rather than downstream, there is no danger in the shut condition that warm water and cold water might come into contact with each other. Because of the upstream positioning, however, one requires two quantity setting valves. Since the common valve element assumes a position of pressure equilibrium, it will suffice to predetermine the total quantity by the quantity setting apparatus because the apportioning of the cross-section to the two setting valves will take place automatically. By reason of this pressure dependence, pressure fluctuations in the supply conduit are also automatically balanced out. The set temperature is therfore for the most part constant under all operating conditions.

It is particularly favourable if, on removing the quantity setting apparatus, the quantity setting valves move to the closed position under the influence of the cold water and warm water supply pressures and the regulating valves as well as the operating element are axially removable from the housing. By having the quantity setting valves upstream, therefore, it is possible to dismantle the more sensitive parts of the regulating valves without operating stop valves in the supply conduits and without completely dismantling the mixing valve.

From a constructional point of view, it is advisable for the two setting valve bases and the second valve element to be of sleeve form and concentrically surround the thermostatic operating element as well as the two regulating valves. This gives a more compact construction which also facilitates removal of the regulating valves and operating element. In this connection it is advantageous fo the first setting valve base to be fixed with respect to the housing and the second setting valve base to be axially displaceable by the quantity setting apparatus. since only one setting valve base has to be adjusted, the construction is simpler.

It is particularly advisable for the one setting valve base to be a sleeve with an external bead and the other setting valve base a sleeve with an internal bead and for the second valve element to overlap both beads and, for the purpose of forming the two quantity setting valves, to have at one end an internal flange co-operating with the external bead and at the other end an external flange co-operating with the internal bead. The beads and flanges together form quantity setting valves which permit a sealed closure. In addition, they constitute mechanical coupling elements with which the second setting valve base can force the second valve element into the closed position if the said base is pushed into its end position by the quantity setting apparatus or the supply pressure.

It is also advantageous for the cold water and warm water supply pressures to act in the same senses on the second valve element and the second valve base so that, upon removing the quantity setting apparatus, the internal flange of the second valve element comes to lie against the external bead of the first setting valve base and the external flange of the second valve element comes to lie against the internal bead of the second setting valve base. This results in automatic closing of the setting valves when the quantity setting apparatus is removed. All forces emanating from the water pressure are taken up by the external bead of the first setting valve base.

Preferably, the second valve element is sealingly displaceable on the first valve element. This proximity also leads to the associated setting and regulating valves being closely adjacent. Short flow paths are obtained and a compact construction of the mixing valve.

Further, the end of a sleeve forming the first setting valve base may form the first regulating valve base. This, again, leads to a compact construction.

The secŏnd regulating valve base may be formed by an insert of which the position is fixed by abutment against a cover secured to the housing. In this way, the two regulating valve bases are installed at a fixed spacing from each other so that the same conditions are obtained for all the set quantities.

It is also advisable for a cold water and a warm water supply passage to be arranged to both sides of the mixed water passage containing the operating element. The mixing valve housing is therefore completely free from such passages at the opposite end. This facilitates withdrawal of the regulating valve components.

Advantageously, the quantity setting apparatus comprises at least one wedge which is disposed between an axially adjustable transmission element and an oblique surface and is displaceable by means of a lever transversely to the adjusting direction, such a quantity setting apparatus is easy to operate.

The transmission element may have pressure fingers engaging through apertures in the cover and acting on the second setting valve base.

It is also favourable for the temperature setting apparatus to comprise a knob which co-operates by way of a screwthread with a slide nut for setting the desired value of the operating element. The temperature setting obtained by rotation is clearly different from the quantity setting obtained by actuating the lever.

The oblique surface, wedge and lever may be disposed in the knob. This results in a more compact construction.

Figure 2:
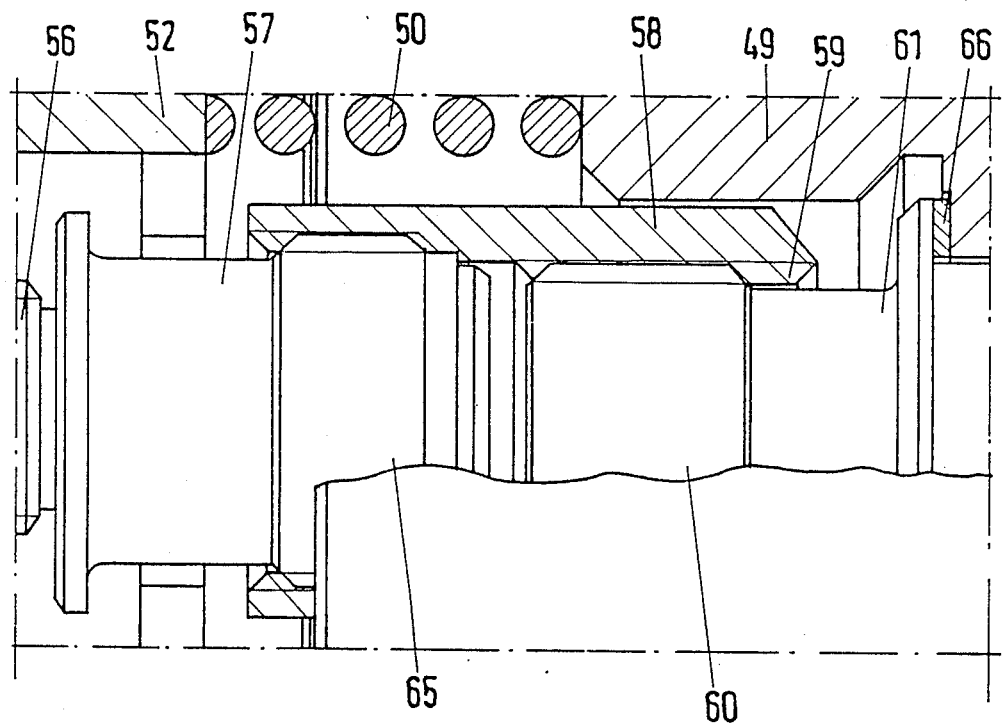
Figure 3:
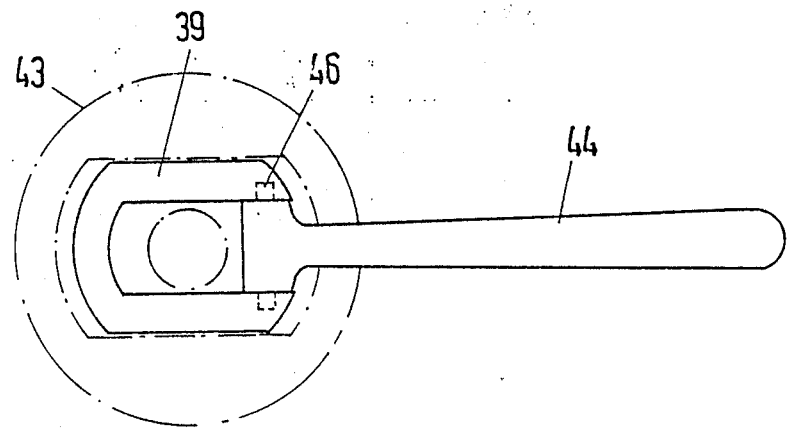
Figure 4:
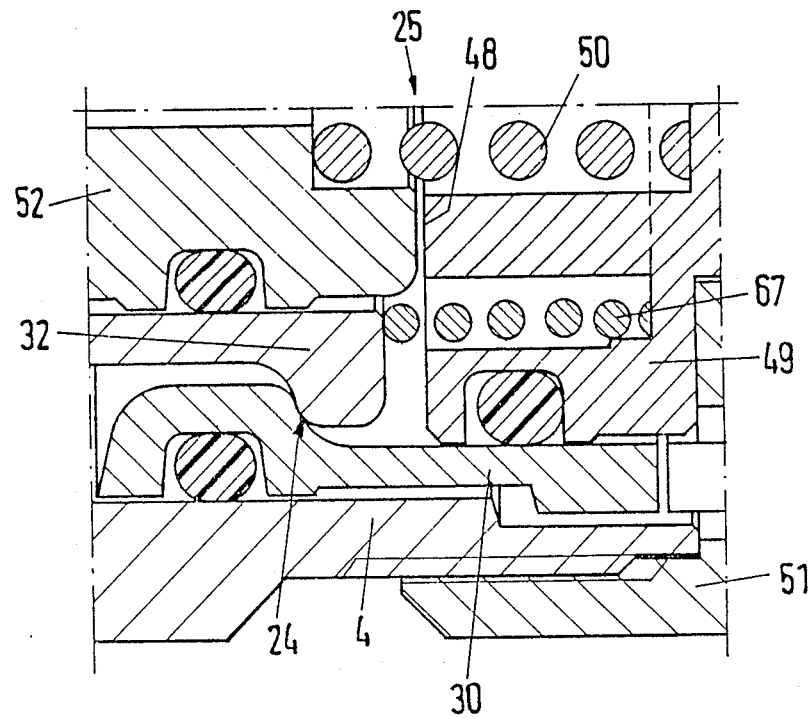

A preferred example of the invention will now be described with reference to the drawing, wherein:

FIG. 1 is a longitudinal section through a mixing valve according to the invention, FIG. 2 is an enlarged part longitudinal section through the inset, FIG. 3 is a diagrammatic plan view onto the knob with lever, FIG. 4 is an enlarged part longitudinal section through the region of a regulating valve and a setting valve of a modified embodiment.

The mixing valve shown in FIG. 1 comprises a housing 1 in two parts. It consists of a connection housing 2 and an attachment housing 4 separated therefrom by a planar dividing gap 3. The connection housing 2 has a cold water connection 5, a warm water connection 6 and a mixed water connection 7. The three connections are each provided with a connecting bore 8, 9 or 10 of which the axes are parallel to each other and normal to the dividing gap 3. The connection housing 2 contains no loose parts and is of a material resistant to galvanising, such as brass. The connection to the pipe mains is by way of a screwthread in the connections 5 and 6 or by soldering.

In the attachment housing there are a cold water passage 11 and a warm water passage 12 arranged to both sides of a mixed water passage 13. These passages terminate in corresponding connecting bores 14, 15 or 16 of which the axes are parallel to each other and normal to the dividing gap 3. The attachment housing 4 with all the parts in and on it contains all the mechanical and automatic functions necessary for quantity and temperature regulation. This unit may be supplied in a ready-adjusted condition from the factory so that no further adjustment is necessary upon replacement.

For sealingly connecting the connection housing 2 and attachment housing 4, plug sleeves 17, 18 or 19 are provided. The section of the plug sleeve 17 engaging in the bore 8 carries a sealing ring 20 in a circumferential groove. The section of the plug sleeve 17 engaging in the bore 14 carries a sealing ring 21 in a circumferential groove. The same applies to the other plug sleeves 18 and 19. The sealing rings could be additionally sealed with silicon grease. The plug sleeves consist of a somewhat more elastic material so that they expand under pressure and thereby improve the seal. For this purpose a harder plastics material is often sufficient. In addition, the plug sleeves 17 and 18 each carry a screen 22 or 23. Upon removing the attachment housing 4, the screens 22 and 23 can therefore be easily inspected, cleaned or replaced. By reason of using the plug sleeves 17, 18 and 19, it is sufficient for the attachment housing 4 to be secured to the abutment housing 2 by only two screws.

The cold water passage 11 communicates with the mixing passage 13 by way of an upstream cold water setting valve 24 and a downstream cold water regulating valve 25. The warm water passage 12 communicates with the mixed water pasasge 13 by way of an upstream warm water setting valve 26 and a downstream warm water regulating valve 27.

The two quantity setting valves 24 and 26 have the following constructions. A first setting valve base 28 is of sleeve form, made in one piece with the plug sleeve 19 and carries an external bead 29. A second setting valve base 30 is of sleeve form and carries an internal bead 31. A common valve element 32 is likewise of sleeve form; it engages over the two beads 29 and 31. An internal flange 33 provided at one end can cooperate with the external bead 29 to form the setting valve 26. An external flange 34 at the other end can co-operate with the internal bead 31 to form the setting valve 24. The internal bead 31 and internal flange 33 also serve to receive a sealing ring for the purpose of sealing against a housing guide.

Under the influence of the pressure in the cold water passage 11, the setting valve base 30 is pressed against pressure fingers 35 of a transmission element 36 which is held by a spring 37 against a slide plate 38. Acting on the latter, there is a quantity setting apparatus 39 which consists of a first wedge 40 with a U-shaped area (FIG. 4) and a second wedge 41 with a similar area that is in turn supported against an oblique surface 42 of a knob 43. The two wedges 40 and 41 are displaceable relatively to each other with the aid of a lever 44 connected to the wedges by the pin 45 and 46. The position of the setting valve base 30 therefore depends on the swung position of the lever 44.

The common valve element 32 is on the left hand side of the internal bead 33 under the influence of the pressure in the warm water pasasge 12 and on the right hand side of the external flange 34 under the influence of the cold water pressure behind the quantity setting valve 24. There is therefore a position of equilibrium for this valve element 32 ensuring that substantially the same pressure obtains behind the setting valves 24 and 26 independently of pressure fluctuations.

If the setting apparatus is brought to its zero position or is completely removed, the common valve element 32 is displaced under the influence of the pressure in the warm water passage 12 until the internal flange 33 abuts the external bead 29 and the setting valve 30 is displaced under the influence of the cold water pressure until the internal bead 31 abuts the external flange 34, so that the cold water and warm water supplies are automatically shut.

For the regulating valves 25 and 27 there are a first regulating valve base 47, formed by the end face of the sleeve forming the setting valve base 28, and, at a fixed spacing therefrom, a second regulating valve base 48 formed by the end face of an insert 49. This insert abuts under the influence of a spring 50 against a screw-cover 51 which is screwed on to the attachment housing 4.

The insert is sealed from the setting valve base 30 by a sealing ring. Between the two regulating valve bases 47 and 48, there is a common piston-like valve element 52 on which the setting valve element 32 is sealingly displaceable.

A thermostatic operating element 53 in the form of a wax cartridge is arranged in the mixing passage 13. It is pressed by a spring 54 against the valve element 52, a cruciform pressure element 55 being interposed. The piston 56 of the operating element 53 lies against a pin 57 which is axially adjustable by turning the knob 43. As shown in more detail in FIG. 2, this takes place in that the pin 57 is carried by a slide sleeve 58 of which the internal screwthread 59 co-operates with the screwthread 60 of a spindle 61 which is mounted in the insert 49, is held in a predetermined axial position by an abutment 66 and is rotatable with the aid of the knob 43. For this purpose, the spindle 61 is connected to this knob 43 by a coupling 62, the whole being protected by a cover 64 which is secured by a screw 63. For adjustment purposes, the pin 57 can be adjusted in the slide nut 58 by means of its screwthread 65.

It will therefore be evident that by turning the knob 43 one can set the desired value of the temperature of the mixed water and that by pivoting the lever 44 one can set the quantity of discharged water. If the temperature of the mixed water is too high, the piston 56 is pushed out of the operating element 53 so that the latter moves to the left against the force of the spring 54. The throttle gap of the warm water regulating valve 27 is reduced accordingly and the temperature of the mixed water drops. The converse is the case with a drop in the mixed water temperature.

Quantity control is effected by raising and lowering the lever 44. The transmission element 36 is axially displaced by way of the wedges 40, 41. This displaces the setting valve base 30 and the cold water setting valve 24 opens. The pressure of the cold water acts on the right hand end face of the valve element 32 and thereby pushes the warm water setting valve 26 into the open position. The entire opening cross section for the warm and cold water supply is thus determined by the position of the setting valve base 30 whilst the ratio of the opening cross-sections of the cold water setting valve 24 and the warm water setting valve 26 are substantially inversely proportional to the pressure ratio between the cold water passage 11 and the warm water passage 12. After loosening the screw 63, the parts 36, 37, 38, 40, 41, 43 and 64 can be removed. One can therefore take off the knob 43 and the quantity setting apparatus. The two setting valves 24 and 26 close under the influence of the water pressure. After unscrewing the cover 51, the temperature regulating parts 49, 50 and 52 to 58 can be taken out so that the operating element 53 can be replaced. This considerably simplifies servicing.

FIG. 4 also illustrates a weak spring 67 which biases the common valve element 32. This spring ensures that the valve element 32 opens even in the case of excessive pressure on the warm water side. The spring 67 is, however, designed so that it will not affect the regulating and self-closing function of the setting valves 24 and 26.

I claim:

1. A thermostatic mixing valve, comprising an axially elongated housing having a first port forming an inlet for a first fluid, a second port forming an inlet for a second fluid and a third port downstream of the first and second ports for forming an outlet port for any one of the first fluid, the second fluid and a mixture of the first and second fluids, first means within the housing that defines an annular quantity setting valve first base and an open first fluid flow path through the first base to the third port, second means within the housing that defines an annular quantity setting second valve base that is in open fluid communication with the first port, adapted to have the first fluid flow thereinto from the first port and axially adjustable relative to the first base, the second valve base having first and second annular terminal ends, third means defining a regulating third base and forming a fluid seal with and within the second base remote from the first port to constantly block fluid flow axially through the second base while permitting fluid flow into the second base from the first port, the second base being axially movable relative to the housing and the third base, a common annular valve element axially movable relative to the first base and having fourth means to cooperate with the first base for controlling the quantity of the first fluid in a downstream direction from the first port toward the first base, and fifth means to cooperate with the second base for controlling the quantity of the second fluid in a downstream direction from the second port and thence into the second base to flow adjacent to the third base, the first base having a valve seat opening thereinto, sixth means co-operating with the valve seat and third base for controlling the relative amounts of the first and second fluids downstream of the fourth and fifth means respectively into the first base for substantially maintaining a desired temperature of mixed fluid flow through the third port while maintaining a substantially constant volume flow through the outlet port, the sixth means including a common valve member axially between the valve seat and the third base for controlling fluid flow downstream of the fourth and fifth means into the first base, adjustable temperature control means including a thermostatic operating element interacting with the valve member to permit selectively changing the temperature of the fluid flow through the third port and adjustable quantity control means for interacting with the second and third means to selectively control the quantity of fluid flow from the first and second ports to the fourth means, the axial position of the common valve element depending upon the fluid pressure at the first and second ports.

2. A mixing valve according to claim 1, characterized in that the adjustable temperature and quantity control means are removably attached to the housing and in removing the termperature control means, allows the second base and common valve element to axially move to closed positions to block fluid flow from the first and second ports downstream to the valve seat and the third base respectively, the common valve element being mounted in the housing for being constantly urged to move axially to a position by fluid pressure at the first and second ports respectively to block downstream first and secod fluid flow.

3. A mixing valve according to claim 1, characterized in that the first and second bases and common valve element are concentric to, and in surrounding relationship to, the thermostatice element, the sixth means and the third base.

4. A mixing valve according to claim 1, characterized in that the first valve base is secured to the housing in a fixed position relative thereto and that the second valve base is axially dispaceable by the adjustable quantity control means.

5. A mixing valve according to claim 1, characterized in that the first base comprises a sleeve having an external annular bead, that the second base comprises a sleeve having an internal bead and that the common valve element has a first end, a second end, an internal flange defining the fourth means at the first end and cooperating with the external bead to control the second fluid flow from the second port and into the common valve element and an external flange defining the fifth means and cooperating with the internal bead to control fluid flow into the second base.

6. A mixing valve according to claim 5 further characterized in that the fluid pressure at the first and second ports acts on the second base flange and the common element bead respectively to axially move the second base and the common valve element respectively toward relative positions to block fluid flow thereinto, and that the quantity control means and temperature control means are removably attached to the housing and when the quantity control means is attached, the quantity control means abuts against the second base for moving the second base axially against the first fluid pressure at the first port and when disattached permits the internal flange to abut against the external bead to block fluid flow therebetween and the external flange to abut against the internal bead to block fluid flow therebetween.

7. A mixing valve according to claim 1, characterized in that the common valve member has an axial inner peripheral wall, and the common valve member is axially displaceable within the common valve element and in fluid sealing engagement with the inner peripheral wall.

8. A mixing valve according to claim 7 characterized in that the housing includes a main part and a cover removable attached to the housing axially remote from the ports and that the third means comprises an insert having the third base, the insert abutting against the cover axially opposite the third base.

9. A mixing valve according to claim 7 characterized in that the housing has a removable cover axially remote from the ports and that the quantity control means includes transmission means axially movable relative to the cover and in abutting relationship to the second valve base for moving the second base in an axial direction to permit first fluid flow in a downstream direction from the first port and resiliently urged in an opposite axial direction, operable wedge means in abutting relationship to the transmission means that includes a pair of wedges that are transversely movable relative to one another for selectively moving the transmission means to permit the first fluid flow in a downstream direction, and a lever attached to the wedges for transversely moving one wedge relative to the other.

10. A mixing valve according to claim 1, characterized in that the housing has a main part and a cover removably secured thereto axially remote from the ports, that the third means comprises an insert having the third base, spring means acting against the common valve member and the insert for resiliently retaining the insert in abutting relationship to the cover, the cover having apertures opening to the second valve base, and that the quantity control means includes transmission means axially movable relative to the cover and insert for axially moving the second base to permit downstream first fluid flow from the first port to adjacent to the third base, the transmission means including fingers extending through the apertures and abutting against the second base.

11. A mixing valve according to claim 10, characterized in that the thermostatic element is located within the first base, and that the temperature control means includes a control knob rotatable relative to the housing and operable means mounted by the insert and connected to the knob and acting with the thermostatic element to, upon rotating the knob, set the desired value of the thermostatic element to maintain the selected desired temperature.

12. A mixing valve according to claim 11 cahracterized in that the quantity control means includes a pair of wedges transversely movable relative to one another and the transmission means to control the axial position to the the transmission means and a lever pivotally connected to each of the wedges for selectively varying the relative transverse position of the wedges.

13. A thermostatic mixing valve, comprising a housing having a cold water supply port, a warm water supply port and a mixed water outlet, first and second means defining cold and warm water regulating valves in the housing, the regulating valves having first and second valve bases, a first valve element cooperation with the first and second valve bases for selectively varying the relative cold and warm water flow to the mixed water port to maintain the desired temperature without varying the quantity of total flow, temperature control means including a thermostatic operating element for actuating the first valve element to selectively vary the desired temperature of the water at the outlet port, a cold water quantity setting valve upstream of the cold water regulating valve and within the housing for controlling the quantity of cold water flow to the cold water regulating valve, a warm water quantity setting valve in the housing upstream of the warm water regulating valve for controlling the quantity of warm water flow to the warm water regulating valve, each of the quantity setting valves including a valve base, and quantity setting means on the housing for axially adjusting the axial position of one of the quantity setting valve bases relative to the other, the quantity setting valves including a common valve member for coacting with the quantity setting bases to control the quantity of cold and warm water flow to the cold water regulating valve and warm water regulating valves, the axial position of the valve member relative to the first and second bases depending upon the pressure at the cold and warm water ports.

* * * * *